US011174946B2

(12) United States Patent
Sato

(10) Patent No.: US 11,174,946 B2
(45) Date of Patent: Nov. 16, 2021

(54) MAGNETIC FLUID SEAL

(71) Applicant: EAGLEBURGMANN JAPAN CO., LTD., Tokyo (JP)

(72) Inventor: Kazuhiko Sato, Tokyo (JP)

(73) Assignee: EAGLEBURGMANN JAPAN CO., LTD.

( * ) Notice: Subject to any disclaimer, the term of this patent is extended or adjusted under 35 U.S.C. 154(b) by 802 days.

(21) Appl. No.: 15/769,053

(22) PCT Filed: Nov. 9, 2016

(86) PCT No.: PCT/JP2016/083195
§ 371 (c)(1),
(2) Date: Apr. 17, 2018

(87) PCT Pub. No.: WO2017/082282
PCT Pub. Date: May 18, 2017

(65) Prior Publication Data
US 2019/0063613 A1    Feb. 28, 2019

(30) Foreign Application Priority Data
Nov. 11, 2015  (JP) .............................. JP2015-221245

(51) Int. Cl.
*F16J 15/43* (2006.01)
(52) U.S. Cl.
CPC ..................................... *F16J 15/43* (2013.01)
(58) Field of Classification Search
CPC ....................................................... F16J 15/43
(Continued)

(56) References Cited

U.S. PATENT DOCUMENTS 4,486,026 A * 12/1984 Furumura ............. F16C 33/746
277/400
4,526,382 A *  7/1985 Raj .......................... F16J 15/43
277/410

(Continued)

FOREIGN PATENT DOCUMENTS

CN  103392087  11/2013  ............... F16J 15/34
CN  204493725   7/2015  ............... F16J 15/34
(Continued)

OTHER PUBLICATIONS

International Preliminary Report on Patentability (translation) issued in application No. PCT/JP2016/083195, dated May 24, 2018 (7 pgs).

(Continued)

*Primary Examiner* — Vishal A Patel
*Assistant Examiner* — L. Susmitha Koneru
(74) *Attorney, Agent, or Firm* — Hayes Soloway P.C.

(57) ABSTRACT

A magnetic fluid seal includes an outer cylinder member that houses therein a rotating shaft extending from a housing of a fluid machine, magnetic pole members housed in the outer cylinder member, disposed around the rotating shaft and forming a magnetic circuit, and sealing films to be formed from magnetic fluids, in an axial direction, in magnetic connection with the magnetic circuit, and between the magnetic pole members and the rotating shaft. The magnetic fluid seal further includes a gas supply passage that allows a gas to flow from an outside toward the magnetic pole members.

3 Claims, 2 Drawing Sheets

(58) Field of Classification Search
USPC .......................................................... 277/410
See application file for complete search history.

(56) References Cited

U.S. PATENT DOCUMENTS

| | | | | |
|---|---|---|---|---|
| 4,592,557 | A * | 6/1986 | Iversen | F16J 15/162 |
| | | | | 277/410 |
| 4,671,677 | A * | 6/1987 | Heshmat | F16C 33/746 |
| | | | | 277/347 |
| 4,696,481 | A * | 9/1987 | Iversen | F16J 15/162 |
| | | | | 277/410 |
| 4,844,138 | A * | 7/1989 | Kokubu | B60C 23/003 |
| | | | | 152/417 |
| 5,806,856 | A * | 9/1998 | Black, Jr. | F16J 15/43 |
| | | | | 277/314 |
| 6,192,603 | B1 | 2/2001 | Seita | 34/559 |
| 6,857,635 | B1 * | 2/2005 | Li | F16J 15/062 |
| | | | | 277/410 |
| 9,581,247 | B2 | 2/2017 | Takigahira et al. | F16J 15/3404 |
| 9,695,941 | B2 | 4/2017 | Fichtner et al. | F16J 15/3404 |
| 2016/0356383 | A1 * | 12/2016 | Fichtner | F16J 15/3404 |

FOREIGN PATENT DOCUMENTS

| | | | |
|---|---|---|---|
| CN | 104948744 | 9/2015 | ............... F16J 15/43 |
| JP | S5429261 | 2/1979 | ............... F16J 15/40 |
| JP | H05263949 | 10/1993 | ............... F16J 15/40 |
| JP | H10220595 | 8/1998 | ............... F16J 15/43 |
| JP | 2000074227 | 3/2000 | ............... B25J 19/00 |
| KR | 100547213 | 1/2006 | ............... B25J 19/00 |

OTHER PUBLICATIONS

Chinese Office Action (w/translation) issued in application No. 201680065413.5, dated Apr. 26, 2019 (15 pgs).
International Search Report and Written Opinion (w/translation) issued in application No. PCT/JP2016/083195, dated Dec. 6, 2016 (14 pgs).
Taiwanese Office Action (w/translation) issued in application No. 105136714, dated Dec. 26, 2017 (8 pgs).
Korean Office Action (w/translation) issued in application No. 10-2018-7012816, dated Sep. 10, 2019 (9 pgs).
Chinese Office Action (w/translation) issued in application No. 201680065413.5, dated Nov. 11, 2019 (13 pgs).

* cited by examiner

MAGNETIC FLUID SEAL

TECHNICAL FIELD

The present invention relates to a magnetic fluid seal used, for example, under a high-temperature environment.

BACKGROUND ART

Conventionally, a magnetic fluid seal is known as a long-lived and clean high-performance seal. This magnetic fluid seal is widely used during a manufacturing process without maintenance of semiconductors or liquid crystals requiring a clean atmosphere, especially its various coating and etching steps.

The magnetic fluid seal is a device that seals a clearance between a rotating shaft and a housing of a fluid machine by using a sealing film composed of a magnetic fluid formed between the rotating shaft, and a magnetic pole member held within an outer cylinder member fixed to the housing of the fluid machine.

The sealing film is formed at these magnetic fluid seals. When a fluid sealed to the fluid machine is, for example, high-temperature gas, heat is transferred from the high-temperature gas to the outer cylinder member, and a temperature of the magnetic pole member within the outer cylinder member rises up gradually. As a result, the temperature of the sealing film of the magnetic fluid rises up, and when this temperature rise becomes excessive, a base liquid of the magnetic fluid may evaporate and sealability of the sealing film may fail to be maintained. There has been proposed the magnetic fluid seal in which this influence of heat is considered and an air intake passage and an air exhaust passage are formed at an inner side of the machine than the sealing film of the outer cylinder member, and that prevents the high-temperature gas from flowing close to the sealing film and coming into contact with the sealing film (see Patent Citation 1).

When the air intake passage and the air exhaust passage are formed as described above, and a gas is allowed to flow in from the air intake passage to the interior of the outer cylinder member, a flow of the gas is formed through a space between the rotating shaft and the outer cylinder member after having been deflected to the air exhaust passage. Therefore, the flow of the gas toward the inner side of the machine can be formed between the rotating shaft and the outer cylinder member, and thereby a movement of the high-temperature gas toward the sealing film is shut off.

CITATION LIST

Patent Literature

Patent Citation 1: Japanese Laid-open Patent Publication H05-263949 (Page 5, FIG. 2)

SUMMARY OF INVENTION

Technical Problem

However, when a gas is supplied to the rotating shaft and a flow of the gas is generated toward the inner side of the machine as described above, the high-temperature gas can be prevented from flowing close to the sealing film. However, heat that has been conducted from the rotating shaft to the sealing film may be stored in the magnetic pole member without sufficient heat dissipation, the temperature of the sealing film rises up gradually, and a base liquid evaporates from the sealing film.

The present invention has been contrived to resolve the problem of the prior art, it being an objective thereof to provide a magnetic fluid seal in which, even when heat is transferred from a rotating shaft to a sealing film, the sealing film is cooled via a magnetic pole member and a life of the sealing film is long.

Solution to Problem

In order to achieve the foregoing objective, a magnetic fluid seal according to a first aspect of the present invention comprises:

an outer cylinder member that houses therein a rotating shaft extending from a housing of a fluid machine;

a magnetic pole member housed in the outer cylinder member and disposed around the rotating shaft, and that forms a magnetic circuit; and a sealing film connected magnetically to the magnetic circuit, disposed between the magnetic pole member and the rotating shaft, made from a magnetic fluid, and formed in an axial direction, characterized in that:

the magnetic fluid seal further comprises a gas supply passage that allows a gas to flow from an outside toward the magnetic pole member.

According to the first aspect, the gas that is allowed to flow from the gas supply passage toward the magnetic pole member hits against an axial end face of the magnetic pole member and the magnetic pole member is cooled by heat exchange, and therefore heat that is conducted to the sealing film can be removed via the magnetic pole member.

The magnetic fluid seal according to a second aspect of the present invention may be characterized in that the gas supply passage includes a discharge port, and the discharge port is toward an axial clearance defined by an axial inner end face of the outer cylinder member and an axial end face of the magnetic pole member and expanding in a circumferential direction.

According to the second aspect, the gas that is allowed to flow from the discharge port expands in the circumferential direction in the axial clearance and comes into contact with the magnetic pole member, as a result, a cooling effect can be equalized.

The magnetic fluid seal according to a third aspect of the present invention may be characterized in that the axial clearance communicates with a radial clearance formed between the rotating shaft and the outer cylinder member.

According to the third aspect, the gas that is allowed to flow from the gas supply passage exchanges heat with the magnetic pole member and then flows to the axially inner side of the machine through a space between the rotating shaft and the outer cylinder member. Therefore, a flow of the gas occurs in the direction of pushing the high-temperature gas on the inner side of the machine back to the inner side of the machine, and the high-temperature gas moves to the atmosphere side along the rotating shaft. As a result, the high-temperature gas can be prevented from coming into contact with the sealing film, and an influence of heat to the sealing film due to the high-temperature gas can be suppressed.

The magnetic fluid seal according to a fourth aspect of the present invention may be characterized in that the outer cylinder member has cooling means for cooling the outer cylinder member, and the axial clearance, the magnetic pole member, and the cooling means are provided in order in the axial direction.

According to the forth aspect, the magnetic pole member is held in the axial direction between the cooling means on the atmosphere side and the air intake passage on the inner side of the machine, and thereby a significant cooling effect can be exhibited.

The magnetic fluid seal according to a fifth aspect of the present invention may be characterized in that a bearing member that holds the rotating shaft and the outer cylinder member so as to be relatively rotatable is disposed on the rotating shaft, and the axial clearance, the magnetic pole member, the cooling means, and the bearing member are provided in order in the axial direction.

According to fifth aspect, a cooling action of the cooling means can be exhibited also on the bearing member, and a failure due to the influence of heat in the entire magnetic fluid seal can be suppressed.

DESCRIPTION OF EMBODIMENT

Figure 1:
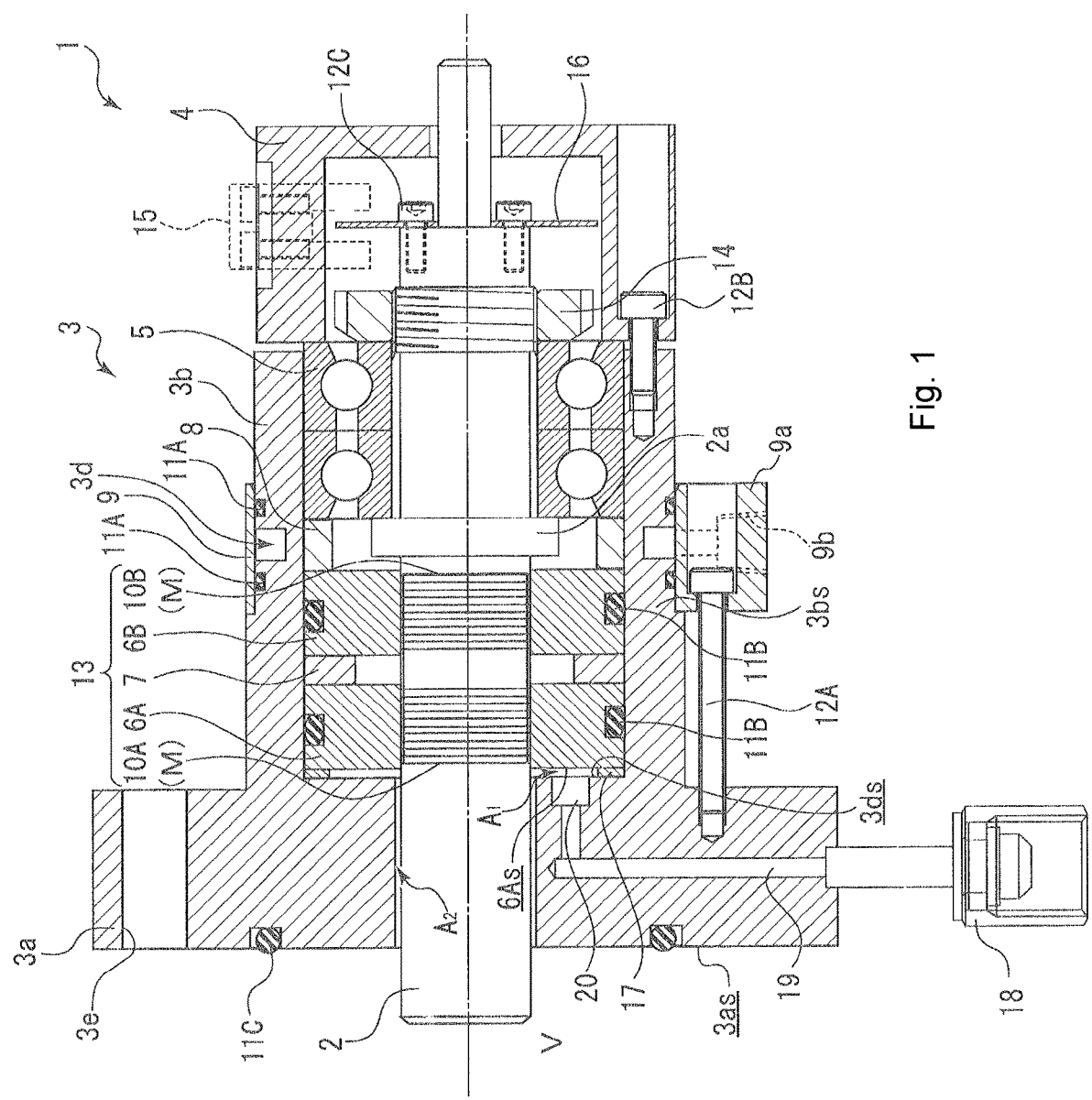
FIG. 1 is a front cross-sectional view showing a first embodiment of the magnetic fluid seal according to the present invention.

Modes for implementing the magnetic fluid seal according to the present invention will hereinafter be described below on the basis of an embodiment. In the following descriptions, a horizontal direction in FIG. 1 is defined as an axial direction of the magnetic fluid seal, and a vertical direction is defined as a radial direction of the magnetic fluid seal. Further, an axial left side is defined as an axially inner side of the machine, and an axial right side is defined as an axially atmosphere side.

First Embodiment

First, a structure of the magnetic fluid seal according to a first embodiment will be described.

As illustrated in FIG. 1, within the magnetic fluid seal 1 according to the present invention, a sealing part 13 is composed, as members for exhibiting principal functions, of magnetic pole members 6A, 6B that are attached to a rotating shaft 2 of a fluid machine, magnetic force generating means 7 that is provided between the magnetic pole members 6A, 6B and forms magnetic poles in the magnetic pole members 6A, 6B, and magnetic fluids 10A, 10B that form sealing films M, M along a magnetic circuit formed between the rotating shaft 2 and the magnetic pole members 6A, 6B. As described above, by using the sealing films M, M that are formed along the rotating shaft 2, the magnetic fluid seal 1 is attached to a housing (not illustrated) of the fluid machine and a clearance of the magnetic fluid seal 1 is sealed between an outer cylinder member 3 and the rotating shaft 2, and thereby there is adopted a structure capable of sealing a gas etc. (including a vacuum) sealed within the fluid machine.

Further, as a structure of the sealing part 13, in the state in which a collar 17 is inserted, a magnetic pole member 6A butts against a butting surface 3ds within an outer cylinder part 3b of the outer cylinder member 3 (described in detail below). Further, the magnetic pole members 6A, 6B fit in the outer cylinder part 3b in the state in which O-rings 11B are inserted into an outer periphery thereof. A spacer 8 comes into contact with a magnetic pole member 6B located on the axially atmosphere side of the sealing part 13 and fits in the magnetic pole member 6B, and further a pair of bearings 5 fits in the axially atmosphere side of the spacer 8. Further, inner rings of the bearings 5 are also axially in contact with a bearing flange 2a that is a diameter enlarged part of the rotating shaft 2, and is interposed along with an outer ring and a rolling body in the radial direction of the outer cylinder member 3 and the rotating shaft 2, and holds the sealing part 13 so that the rotating shaft 2 can relatively rotate smoothly with respect to the outer cylinder member 3.

Further, on the axially atmosphere side of the bearings 5, a lock nut 14 is fixed on an end portion of the rotating shaft 2 through threaded engagement, and as a result the sealing part 13 is fixed into the outer cylinder part 3b of the outer cylinder member 3 in the state in which the inner rings of the bearings 5 are pressed into the axially inner side of the machine. Further, an end cap 4 fits in the axially atmosphere side of the outer rings of the bearings 5, and is fixed to the outer cylinder part 3b by hexagon head bolts 12B. Note that, an encoder member 16 that detects a rotational state of the rotating shaft 2 is fixed to an end face of the rotating shaft 2 by hexagon head bolts 12C and a position such as a position of rotation, the center of rotation, or the like is detected by electric equipment 15 (a photosensor or the like) provided on the end cap 4. In addition, this electric equipment 15 generally consists of parts sensitive to heat.

Next, the outer cylinder member 3 is made of metal, and is composed of a flange part 3a attached to the housing of the fluid equipment, the outer cylinder part 3b in which the sealing part 13, the spacer 8, and the bearings 5 are provided therein, and a small diameter part 3c formed between the flange part 3a and the outer cylinder part 3b and having a small diameter in the radial direction. The flange part 3a is a disk-shaped segment having a large diameter in the radial direction and further in the flange part 3a, an O-ring 11C is provided on a mounting surface 3 as side fixed to the housing of the fluid equipment, and a plurality of mounting holes 3e are provided in the circumferential direction. Further, in the outer periphery of the outer cylinder part 3b, a cooling groove 3d having a recessed cross section is provided along the circumferential direction in a substantially center position in the axial direction between the magnetic pole member 6B and the bearings 5. Further, the cooling groove 3d is held liquid-tightly by an outer cylinder cover 9 in the state in which O-rings 11A are inserted.

Herein, a fixing member 9a having an inlet port 9b is provided in a predetermined position in the circumferential direction of the outer cylinder cover 9. By using hexagon head bolts 12A inserted into this fixing member 9a, the fixing member 9a is fixed to the flange part 3a, thereby fixing the outer cylinder cover 9 to an outer peripheral part of the outer cylinder part 3b.

Further, there is adopted a structure in which cooling liquid is flowed into the cooling groove 3d from the inlet port 9b of the fixing member 9a, thereby exhibiting the after-mentioned cooling action.

Next, a gas port 18 that allows a high-pressure gas g to flow in is provided on a radial end face of the flange part 3a. There is adopted a structure in which the gas port 18 communicates to a discharge port 20 via a gas flow passage 19 (a gas supply passage) composed of a radial passage within the flange part 3a and an axial passage communicating to the radial passage, and further the high-pressure gas that is flowed in from the gas port 18 into the outer cylinder member 3 is discharged from the discharge port 20 to an end face on the axially inner side of the machine 6As of the magnetic pole member 6A. In addition, argon or nitrogen chemically stable can be adopted as the high-pressure gas.

Next, a temperature state of the magnetic fluid seal 1 will be described.

The high-pressure gas may be used and sealed within the fluid machine, and when the temperature in the fluid machine becomes equal to or lower than a predetermined temperature, the high-temperature gas changes from a gas to a solid and byproducts are generated. Due to the generation of the byproducts, the byproducts adhere to the periphery of the sealing films M, M are caught thereinto, and as a result, the sealability of the sealing films M, M deteriorates. At the same time, when the fluid machine is manufacturing equipment, quality of products to be manufactured by the manufacturing equipment will deteriorate. Therefore the temperature within the fluid machine needs to be kept higher than a predetermined temperature Tg. The predetermined temperature Tg differs depending on the type of a gas sealed by the fluid machine and is set higher than 150° C. (Tg>150° C.) in this description.

Herein, as illustrated in FIG. 1, the flange part 3a provided on the axially inner side of the machine of the magnetic fluid seal 1 is in contact with the housing of the fluid machine, on which the flange part 3a is fixed. Further, the rotating shaft 2 is extended continuously from the interior of the fluid machine. Further, a sealed fluid is filled between the interior of the fluid machine and the sealing films M, M of the magnetic fluid seal 1. Heat within the fluid machine is transferred to the magnetic fluid seal 1 and adverse effects may be exerted on the magnetic fluid seal 1 due to the heat.

Herein, the magnetic fluids 10A, 10B that form the sealing films M, M in the magnetic fluid seal 1 are a solution including three materials of ferromagnetic fine particles having magnetism, surfactant covering their surfaces, and base liquid containing water or oil.

From the magnetic fluids 10A, 10B, water or oil of the base liquid evaporates under a high-temperature environment and the magnetic fluid 10A, 10B lose fluidity by failing to remain in a fluid state. As a result, the sealing films M, M are divided due to friction between the magnetic fluids 10A, 10B and the outer peripheral surface of the rotating shaft 2, and the sealability of the sealing films M, M of the magnetic fluid 10 fails to be maintained. In order to prevent the above-described state, the temperature of the magnetic fluid 10 needs to be always kept lower than a heatproof temperature Ts. The heatproof temperature Ts is changed depending on the type of the magnetic fluid and, in the present embodiment, is set to Ts<150° C.

Also, the bearings 5 that hold the rotating shaft 2 and the outer cylinder part 3b in the radial direction may suffer from adverse effects such as worse durability due to heat, or deformation and low rotational accuracy due to heat. In order to prevent the above-described adverse effects, the bearings 5 need to be always kept lower than a heatproof temperature Tb. The heatproof temperature Tb differs depending on the quality of materials of components used for the bearing and is in the present embodiment set to Tb<100° C. Also, concerning the accuracy in rotation detection, electric equipment parts, which detect positions such as a rotational position and the center of rotation may also similar to the bearings, and when the electric equipment parts suffer from heat equal to or higher than the heatproof temperature of the electric equipment 15, the accuracy in rotation detection is reduced and the electric equipment parts can no longer be used as fluid equipment.

Next, the mechanism of heat conduction from the fluid machine to the magnetic fluid seal 1 will be described in detail. For a main route of the heat conduction, as a first route, solid heat conduction via the outer cylinder member 3 is performed such that heat is transferred from the flange part 3a to the outer cylinder part 3b and then the heat is transferred from the outer cylinder part 3b to the magnetic pole members 6, and furthermore the heat is transferred from the magnetic pole members 6 to the magnetic fluid 10. Next, as a second route, the solid heat conduction via the rotating shaft 2 is performed such that heat is transferred from the rotating shaft 2 to the magnetic fluid 10. Further, as a third route, gas heat conduction via the sealed fluid is performed such that heat is conducted from a clearance between the rotating shaft 2 and the outer cylinder member 3 to the magnetic fluid 10 via high-temperature gas V. Further, these heat conductions are phenomena that occur at the same time. Note that a route of the heat transfer due to thermal radiation is also present strictly; however, its description is omitted due to limited influence.

Herein, as a route of the heat conduction in which an influence is relatively great, the gas heat conduction via the sealed fluid, which is the third route, is included such that heat is transferred from the clearance between the rotating shaft 2 and the outer cylinder member 3 to the magnetic fluid 10 via the high-temperature gas V. The reason is that the third conduction route is different from the other conduction routes, and the high-temperature gas that is the sealed fluid comes directly into contact with the magnetic fluids 10A, 10B that are the sealing films M, M.

As described hereinbefore, in the magnetic fluid seal 1 according to the present invention, the gas port 18 that allows the high-pressure gas g to flow in is provided on the radial end face of the flange part 3a. Therefore, the heat conducted to the sealing films M, M via the third conduction route can be removed.

Figure 2:
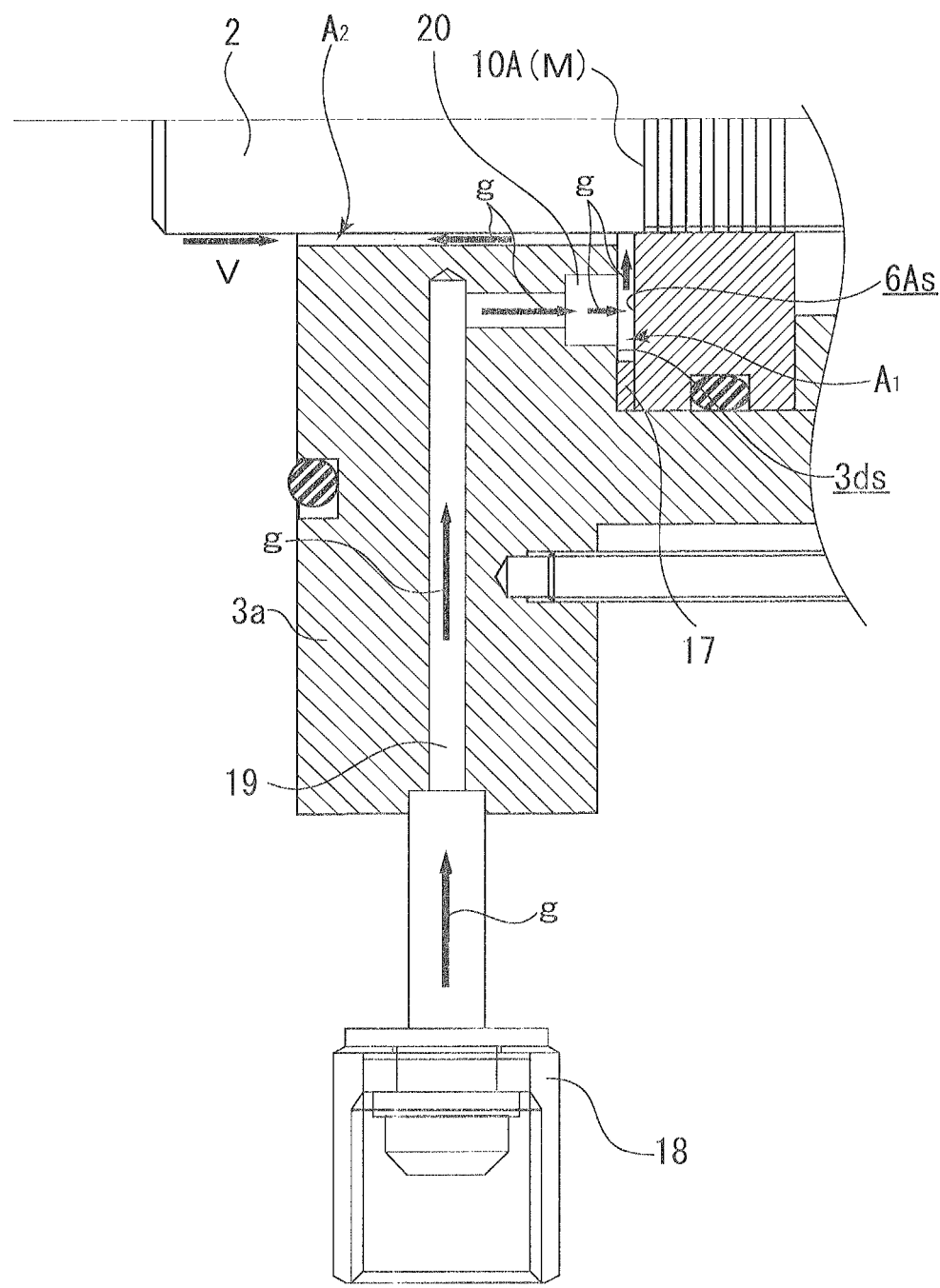
FIG. 2 is a partially enlarged view illustrating a flow of a gas in the first embodiment.

The flow of the high-pressure gas g will be described below in detail. As illustrated in FIG. 2, the high-temperature gas V is filled within the fluid machine (not illustrated) on the axially inner side of the machine of the flange part 3a. In this state, when the high-pressure gas g is allowed to flow in from the gas port 18, after being allowed to flow to the gas flow passage 19 in the radial direction, the flow direction of the high-pressure gas g is converted to the axial direction. Then, the high-pressure gas g is discharged into an axial clearance $A_1$ toward an end face 6As, on the axially inner side of the machine, of the magnetic pole member 6A from the discharge port 20 provided on the butting surface 3ds of the outer cylinder part 3b located on the axially inner side of the machine. The axial clearance $A_1$ is a space in which the magnetic pole member 6A and the butting surface 3ds face to each other, and further is a space having an axial direction width as much as the thickness of the inserted collar 17.

As described above, the high-pressure gas g is discharged toward the end face on the axially inner side of the machine 6As, and thereby heat of the magnetic pole member 6A is removed by the heat exchange with the high-pressure gas. Therefore, heat of the sealing film M formed by the magnetic fluid 10A coming into contact with the magnetic pole member 6A is removed by the high-pressure gas g via the magnetic pole member 6A, and the temperature rise of the sealing film M can be prevented. As a result, the base liquid of the magnetic fluid 10A that forms the sealing film M can be suppressed from evaporating, and the sealability can be maintained for long periods.

Further, since the axial clearance $A_1$ is formed in the circumferential direction along the rotating shaft 2, the high-pressure gas g discharged into the axial clearance $A_1$ flows gradually along the circumferential direction of the end face, on the axially inner side of the machine 6As, of the magnetic pole member 6A. Therefore, the cooling action can be exhibited on the magnetic pole member 6A over the entire periphery of the end face on the axially inner side of the machine 6As, and a cooling effect can be equalized.

Next, the axial clearance $A_1$ communicates with a radial clearance $A_2$ formed between the rotating shaft 2 and an inner peripheral surface of the flange part 3*a* of the outer cylinder member 3. The high-pressure gas g flowing along the circumferential direction of the axial clearance $A_1$ flows gradually into the radial clearance $A_2$, and flows into the fluid machine section located on the axially inner side of the machine. As described above, the high-pressure gas g flows into the machine inner side of the radial clearance $A_2$ and thereby comes into contact with the rotating shaft 2 and removes heat of the rotating shaft 2, which is conducted from the high-temperature gas V. At the same time, the flow of the high-pressure gas g is formed toward the axially machine inner side of the radial clearance $A_2$. The flow of this high-pressure gas g toward the axially machine inner side faces to a flow in which the high-temperature gas V is close to the vicinity of the sealing films M, M, and therefore the high-temperature gas V can be prevented from moving to the vicinity of the sealing films M, M.

Further, in the magnetic fluid seal 1 of the present invention, the cooling groove 3*d* acting as the cooling means is provided in the outer cylinder part 3*b* of the outer cylinder member 3 and between the magnetic pole member 6B and the bearings 5 in the axial direction. Therefore, the sealing part 13 and the bearings 5 can be cooled with the cooling water that is allowed to flow into the cooling groove 3*d*. Therefore, the temperature environments of the magnetic fluids 10A, 10B are maintained in the state close to each other, and are appropriately cooled with ease without being affected by the high-temperature on the machine inner side.

Since the bearings 5 having the heatproof temperature Tb which is lower than the heatproof temperature Ts of the magnetic fluid 10, are located on the axially atmosphere side of the cooling groove 3*d*, the magnetic fluid seal 1 can be so constituted that the temperatures of the bearings 5 are easily prevented from rising.

Now, effects of the cooling means on the sealed fluid will be described below. To prevent the generation of such byproducts, it is necessary to hold, at 150° C. or more, the temperature of the high-temperature gas which is the sealed fluid filled on the inner side of the machine than the magnetic fluid 10A as viewed on axial direction. In view of the foregoing, it is desirable to determine the axial position of the cooling groove 3*d* and the flow rate of the cooling water. More specifically, the temperature of the high-temperature gas needs to be determined so that Tg becomes equal to or higher than 150° C. The position in the axial direction of the cooling groove 3*d* and the flow rate of the cooling water needs to be set so that the settings of Ts<150° C. and Tb<100° C. are satisfied.

The embodiment has been described above with reference to the drawings, but the specific configuration of the present invention shall not be limited thereto. The present invention also includes any modifications or additions made within a scope that does not depart from the spirit of the present invention.

For example, in the above-described embodiment, an example in which the discharge port 20 is provided at one place is described; however, it is not limited to this embodiment. Plural discharge ports 20 may be provided in the butting surface 3*ds* at positioning along the circumference thereof, and plural gas ports 18 and gas flow passages 19 may also be provided accordingly.

Further, the description has been made about the case in which the flow of the high-pressure gas g supplied from the discharge port 20 is orthogonal to the end face of the magnetic pole member 6A. However, the high-pressure gas g may be directed toward the magnetic pole member 6A, in other directions, for example, with radial components. In this case, the high-pressure gas g can be evenly supplied in the circumferential direction.

REFERENCE SIGNS LIST

1 Magnetic fluid seal
2 Rotating shaft
3 Outer cylinder member
3*a* Flange part
3*b* Outer cylinder part
3*d* Cooling groove (cooling means)
5 Bearing (bearing member)
6 Magnetic pole member
6As End face on the axially inner side of the machine
7 Magnetic force generating means
10 Magnetic fluid
18 Gas port
19 Gas flow passage (gas supply passage)
20 dicharge port
$A_1$ Axial clearance
$A_2$ Radial clearance
M Sealing film
g High-pressure gas
V High-temperature gas

The invention claimed is:

1. A magnetic fluid seal comprising:
an outer cylinder member that houses therein a rotating shaft extending from a housing of a fluid machine;
a pair of magnetic pole members housed in the outer cylinder member and disposed around the rotating shaft; and
a magnetic force generator that is provided between the magnetic pole members and configured to generate magnetic poles in the magnetic pole members, wherein
the rotating shaft, the magnetic pole members and the force generator form a magnetic circuit,
the magnetic fluid seal further comprises a sealing film connected magnetically to the magnetic circuit, disposed between the magnetic pole member and the rotating shaft, made from a magnetic fluid, and formed in an axial direction, and
a gas supply passage that allows a gas to flow from an outside toward the magnetic pole members,
the gas supply passage includes a discharge port,
the discharge port is directed toward an axial clearance defined by an axial inner end face of the outer cylinder member and an axial end face of the magnetic pole member positioned on a side of the discharge port, and expands in a circumferential direction,
the axial clearance communicates with a radial clearance defined by the rotating shaft and the outer cylinder member, and
gas flowing out from the discharge port flows in the axial clearance in the circumferential direction, further flows into the radial clearance and further more flows toward an inner side of the fluid machine.

2. The magnetic fluid seal as set forth in claim 1, wherein:
the outer cylinder member has a heat exchanger for cooling the outer cylinder member, and
the axial clearance, the magnetic pole members, and the heat exchanger are provided in order in the axial direction.

3. The magnetic fluid seal as set forth in claim 2, wherein:
a bearing member that holds the rotating shaft and the outer cylinder member so as to be relatively rotatable is disposed on the rotating shaft, and
the axial clearance, the magnetic pole members, the heat exchanger, and the bearing member are provided in order in the axial direction.

\* \* \* \* \*